(12) United States Patent
Gans et al.

(10) Patent No.: US 6,918,847 B2
(45) Date of Patent: Jul. 19, 2005

(54) HOCKEY STICK BLADE

(75) Inventors: Adam Gans, Prévost (CA); Ken Covo, Pointe-Claire (CA)

(73) Assignee: Bauer Nike Hockey Inc., St-Jerome (CA)

( * ) Notice: Subject to any disclaimer, the term of this patent is extended or adjusted under 35 U.S.C. 154(b) by 158 days.

(21) Appl. No.: 10/691,978

(22) Filed: Oct. 24, 2003

(65) Prior Publication Data

US 2005/0090339 A1 Apr. 28, 2005

(51) Int. Cl.$^7$ .............................................. A63B 59/14
(52) U.S. Cl. ...................................................... 473/563
(58) Field of Search ................................ 473/560–563

(56) References Cited

U.S. PATENT DOCUMENTS

| | | | |
|---|---|---|---|
| 4,343,468 A | | 8/1982 | Lindgren |
| 4,358,113 A | * | 11/1982 | McKinnon et al. ......... 473/561 |
| 4,488,721 A | | 12/1984 | Franck et al. |
| 5,050,878 A | * | 9/1991 | Deleris ....................... 473/561 |
| 5,217,221 A | * | 6/1993 | Baum .......................... 473/561 |
| 5,333,857 A | * | 8/1994 | Lallemand ................... 473/561 |
| 5,407,195 A | * | 4/1995 | Tiitola et al. ................ 473/563 |
| 5,676,608 A | * | 10/1997 | Christian et al. ........... 473/563 |
| 5,728,016 A | * | 3/1998 | Hsu ............................. 473/563 |
| 6,033,328 A | | 3/2000 | Bellefleur et al. |
| 6,062,996 A | * | 5/2000 | Quigley et al. ............. 473/563 |
| 6,626,775 B2 | | 9/2003 | Tiitola |
| 2002/0065154 A1 | | 5/2002 | Goldsmith et al. |
| 2003/0104883 A1 | | 6/2003 | Caron |
| 2003/0119612 A1 | | 6/2003 | Goldsmith et al. |

FOREIGN PATENT DOCUMENTS

| | | |
|---|---|---|
| CA | 2062635 | 9/1993 |
| CA | 2228104 | 9/1998 |
| CA | 2244610 | 2/1999 |
| EP | 1316335 A1 * | 6/2003 |
| WO | WO 03/097181 A1 * | 11/2003 |

* cited by examiner

*Primary Examiner*—Mark S. Graham (57) ABSTRACT

A hockey stick blade comprising a core extending along a longitudinal axis, the core comprising a first portion being made of foam having a first density and a second portion being made of foam having a second density. The second density is higher than the first density.

32 Claims, 12 Drawing Sheets

HOCKEY STICK BLADE

FIELD OF THE INVENTION

The present invention relates to a hockey stick blade comprising a core made of foam. The invention also relates to a hockey stick comprising such a blade.

BACKGROUND OF THE INVENTION

Typical hockey stick blades or replacement blades are generally made of a wooden core reinforced with one or more layers of synthetic material such as fiberglass, carbon fiber or graphite. The core of the blade may also be made of a synthetic material reinforced with layers of fibers material. The layers are usually made of woven filament fibers, typically soaked in a resin and glued to the surfaces of the core of the blade. Expandable fibers braids may also be used for recovering the core of the blade.

Canadian Patent Application 2,228,104 discloses a hockey stick comprising a wooden shaft and a composite blade with a pre-form core made of thermoplastic polyurethane foam. The pre-form core is recovered of braided glass socks and layers of reinforcing materials.

U.S. Pat. No. 5,050,878 discloses an expanded polyvinyl chloride foam core stick wherein the core is covered with meshes of fiberglass or carbon fibers.

U.S. Pat. No. 5,333,857 discloses a hockey stick comprising a shaft section, a blade section and a heel section forming the connection between the blade and shaft sections. The stick comprises a core made of synthetic foam having a first density for the shaft, a second density for the heel and a third density for the blade. The core is covered with three layers of woven materials.

There is a demand for an improved hockey stick blade having specific mechanical properties for specific portions of the blade.

SUMMARY OF THE INVENTION

As embodied and broadly described herein, the invention provides a hockey stick blade comprising a shank, a heel section and a blade element having a top edge, a tip edge and a bottom edge. The blade further comprises a core extending along a longitudinal axis and comprising a first portion located above a second portion. The first portion comprises a bottom surface and extends from the heel section to the tip edge, the first portion being made of foam having a first density. The second portion comprises a top surface and extends from the heel section to the tip edge, the second portion being made of foam having a second density. The second density is higher than the first density.

Other objects and features of the invention will become apparent by reference to the following description and the drawings.

BRIEF DESCRIPTION OF THE DRAWINGS

A detailed description of the embodiments of the present invention is provided herein below, by way of example only, with reference to the accompanying drawings, in which.

In the drawings, the embodiments of the invention are illustrated by way of examples. It is to be expressly understood that the description and drawings are only for the purpose of illustration and are an aid for understanding. They are not intended to be a definition of the limits of the invention.

DETAILED DESCRIPTION OF THE EMBODIMENTS

Figure 1:
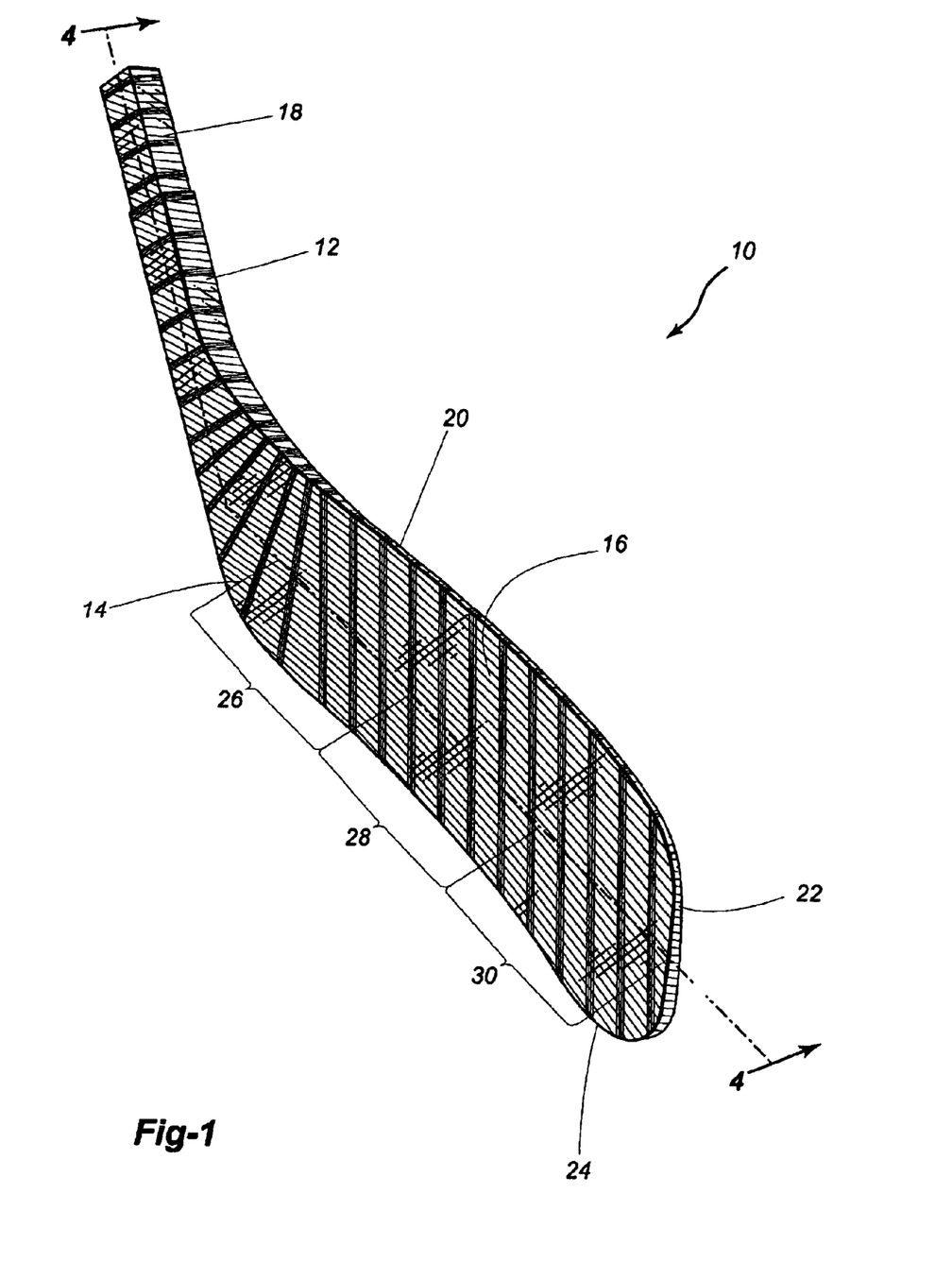
FIG. 1 is a perspective view of a hockey stick blade constructed in accordance with the invention.
Figure 2:
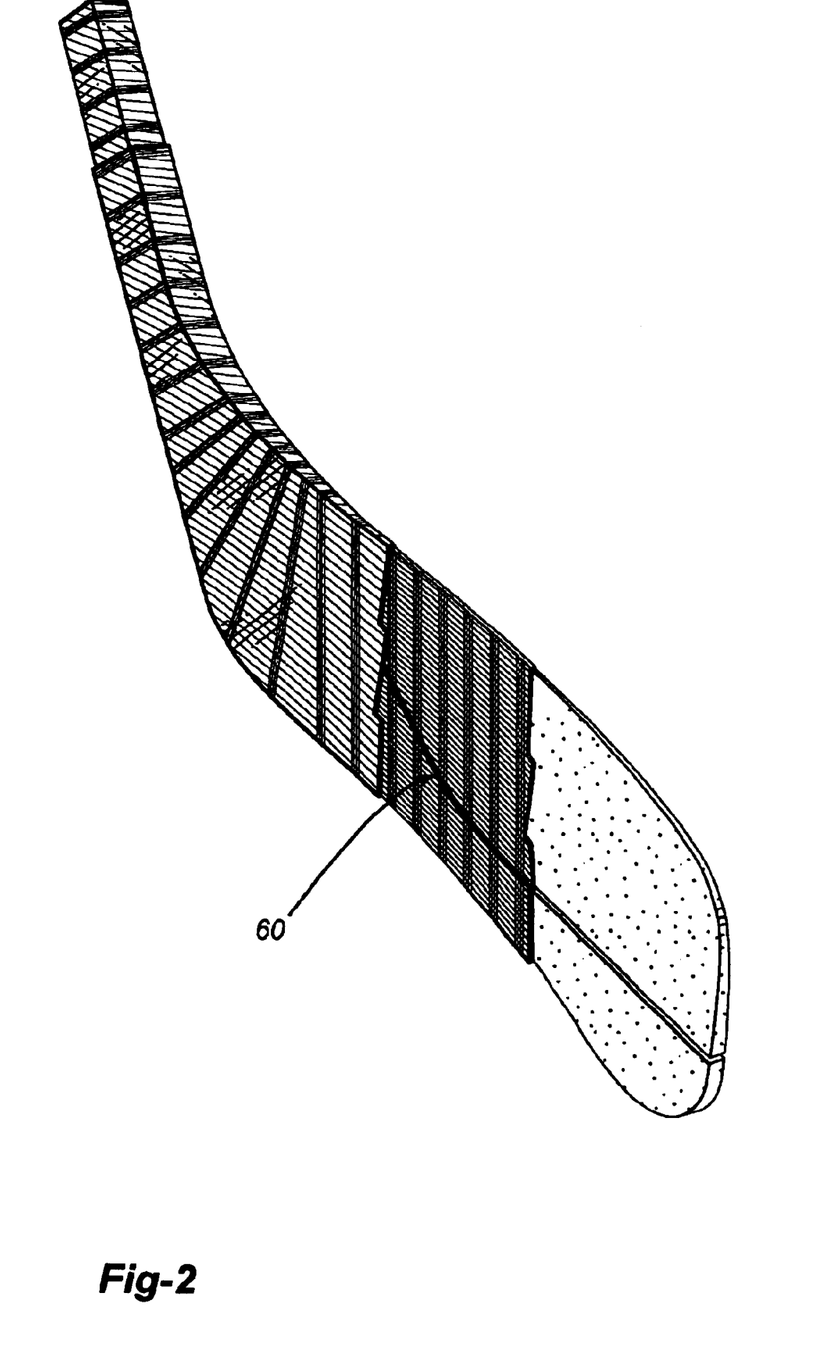
FIG. 2 is a perspective view of the blade of FIG. 1 with portions being peel off.
Figures 13, 14:
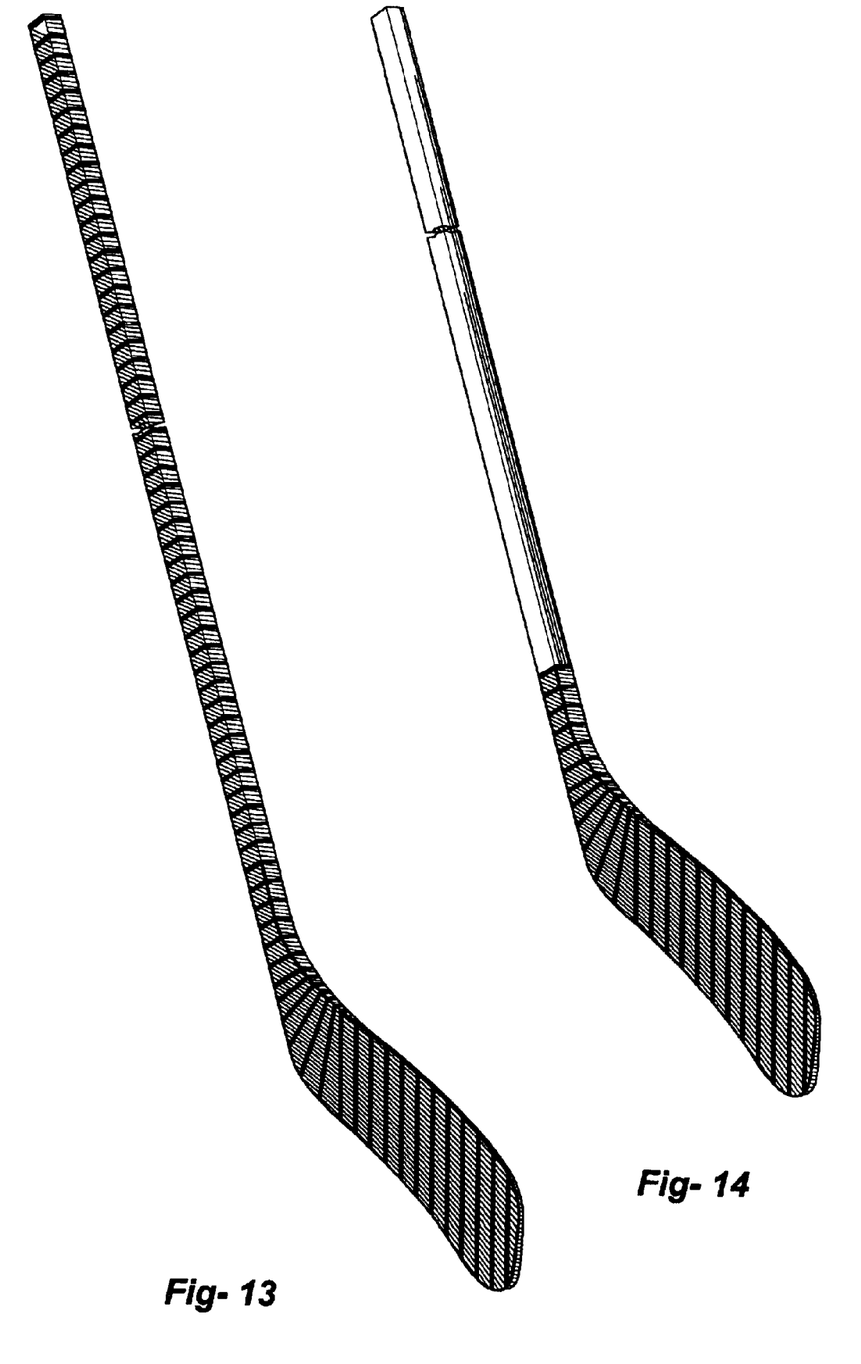
FIG. 13 is a perspective view of a hockey stick with the blade of FIG. 1 integrally formed with the shaft.
FIG. 14 is a perspective view of a hockey stick with the blade of FIG. 1.

FIGS. 1 and 2 illustrate a hockey stick blade 10 constructed in accordance with the invention. The blade 10 comprises a shank 12, a heel section 14 and a blade element 16. The heel section 14 is located at the junction of the shank 12 and the blade element 16. The shank 12 comprises a tenon 18 adapted to be inserted into a hollow hockey stick shaft made of aluminum, composite or graphite (see FIG. 14). It is understood that instead of having the tenon 18, the shank 12 can be integrally formed with a hockey stick shaft (see FIG. 13). The blade element 16 comprises a top edge 20, a tip edge 22 and a bottom edge 24. The blade element 16 may be separated in three different regions, namely a heel region 26, a middle region 28 and a tip region 30.

Figures 3, 4:
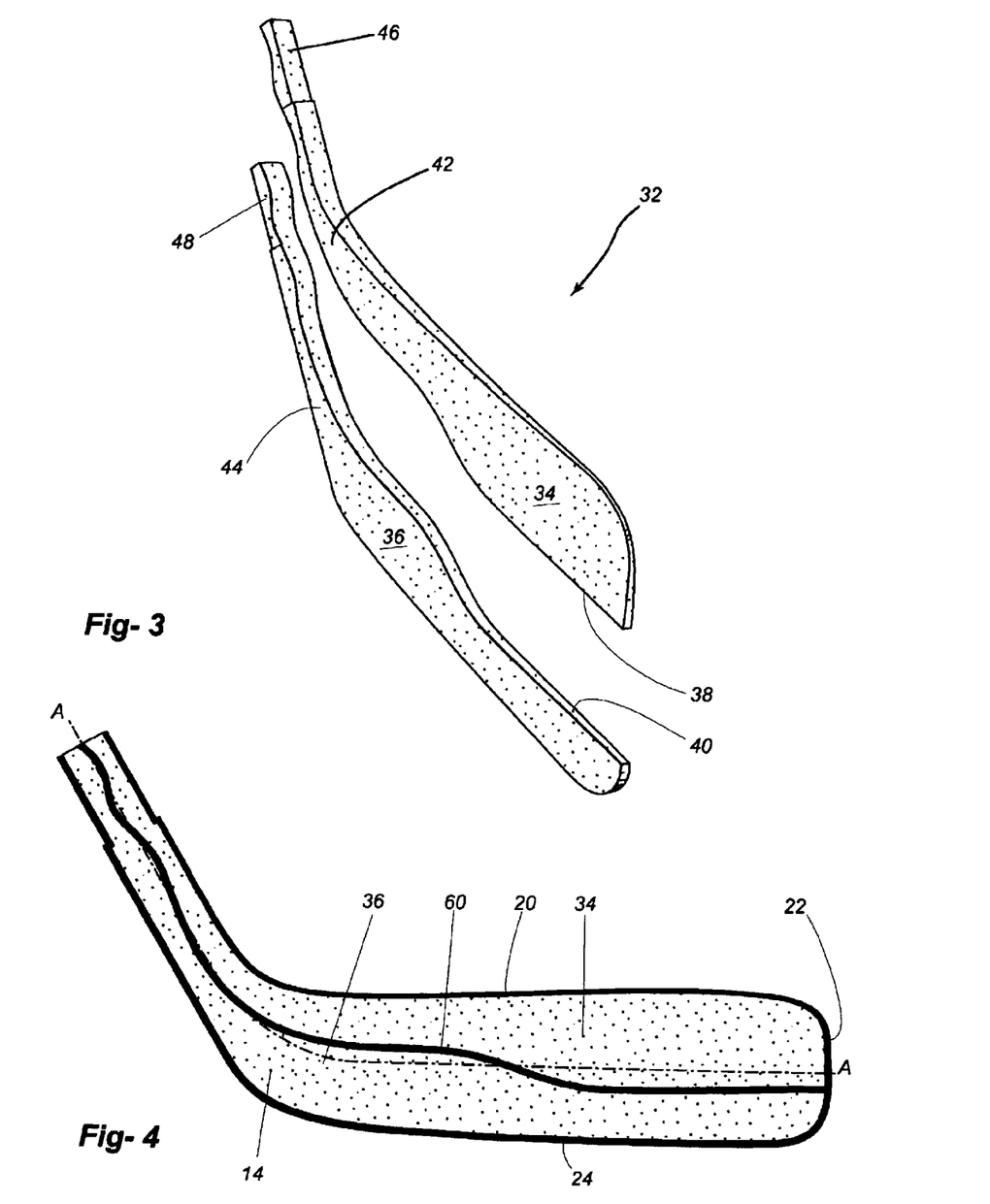
FIG. 3 is a perspective view of first and second core portions used in the construction of the blade of FIG. 1.
FIG. 4 is a cross sectional view taken along line 4—4 of FIG. 1.

As shown in FIGS. 3 and 4, the blade 10 comprises a core 32 extending along a longitudinal axis A—A. The core 32 comprises a first portion 34 located above and aligned with a second portion 36. The first and second portions 34, 36 are dimensioned such as to have the shape of a blade when aligned with one another.

The first portion 34 comprises a bottom surface 38 and extends from the heel section 14 to the tip edge 22. The first portion 34 is generally delimited by its bottom surface 38 and the planes defined by the top and tip edges 20, 22. The second portion 36 comprises a top surface 40 and extends from the heel section 14 to the tip edge 22. The second portion 36 is generally delimited by its top surface 40 and by the planes defined by the bottom and tip edges 24, 22. As shown in FIG. 3, the first and second portions 34, 36 may further comprise respective shank portions 42, 44 defining the core of the shank 12, these shank portions 42, 44 comprising respective tenon portions 46, 48. The shank portions 42, 44 generally extend upwardly and rearwardly from the heel section 14. Hence, the core 32 comprises the first portion 34 with its shank portion 42 and the second portion 36 with its shank portion 44.

It is understood that the core may comprise first and second portions that do not comprise respective first and second shank portions. In fact, the first and second portions of the core may be confined to the blade element of the hockey stick blade (from the heel section to the tip edge) and the shank may be a separate component that is joined to the blade element. For example, the shank may be made of wood and comprises a groove in which a tongue portion provided on the blade element is inserted for joining together both components.

The first and second portions 34, 36 are made of foam such as thermo-expandable foam selected in the group consisting of polyurethane foam, ethylene vinyl acetate (EVA) foam, polyvinyl chloride (PVC) foam, ethylene polypropylene foam and polyisocyanurate foam. For example, the first and second portions 34, 36 may be made of thermo-expandable polyurethane foam sold by General Plastic Manufacturing or Burton Corporation. The first and second portions 34, 36 may be cut from a sheet of foam. Liquid foam may also be injected in a mold in order to form the first and second portions 34, 36.

The second portion 36 is made of foam having a higher density than the one of the first portion 34. For example, the first portion 34 may be made of foam having a density of between 6 to 12 lbs/cubic foot while the second portion 36 may be made of foam having a density of between 14 to 18 lbs/cubic foot. In one possible embodiment, the first portion 34 is made of foam having a density of 10 lbs/cubic foot and the second portion 36 is made of foam having a density of 15 lbs/cubic foot.

As shown in FIGS. 3 and 4, the bottom surface 38 of the first portion 34 and the top surface 40 of the second portion 36 extend generally along an irregular line. More particularly, the top surface 40 of the second portion 36 extends beyond the longitudinal axis A—A in the heel region 26 such that the heel region 26 of the blade 10 is mostly made of higher density foam. In fact, it is recognized that the heel region 26, and more particularly the lower part of the heel region 26, is more subject to impacts. In the tip region 30, the bottom surface 38 of the first portion 34 extends beyond the longitudinal axis A—A such that the tip region 30 of the blade 10 is mostly made of lower density foam in order to reduce the weight of the blade 10. In fact, it is recognized that the tip region 30, and more particularly the upper part of the tip region 30, is less subject to impacts. In another embodiment, the bottom and top surfaces of the respective first and second portions may both extend along the longitudinal axis of the blade.

Hence, higher density foam is used in the second portion 36 for sustaining high-speed impacts while lower density foam is used in the first portion 34 for reducing weight. Use of lower density foam may also damper energy upon impacts.

Figure 5:
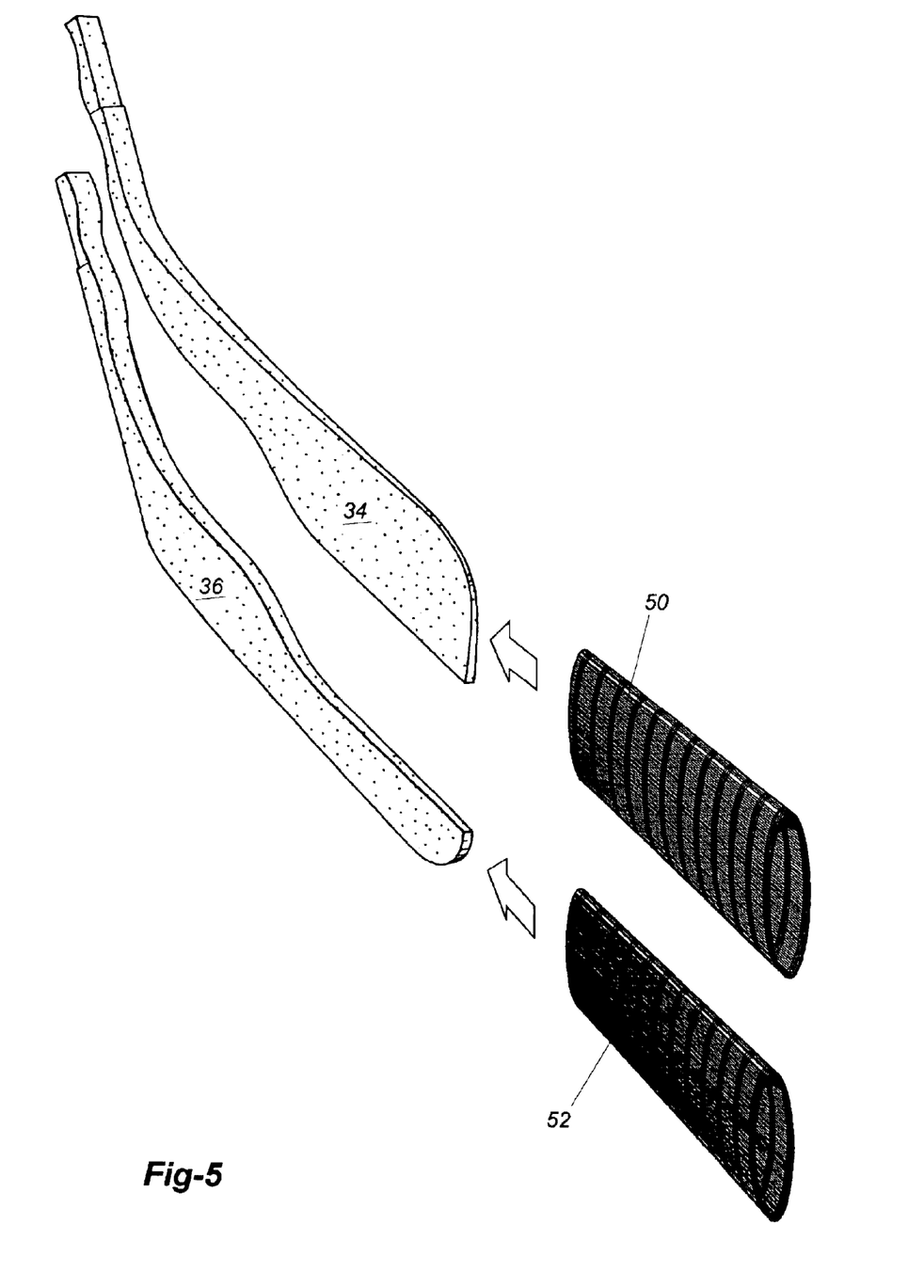
FIG. 5 is a perspective view of the first and second core portions of FIG. 4 with first and second fibers braids used in the construction of the blade of FIG. 1.
Figure 6:
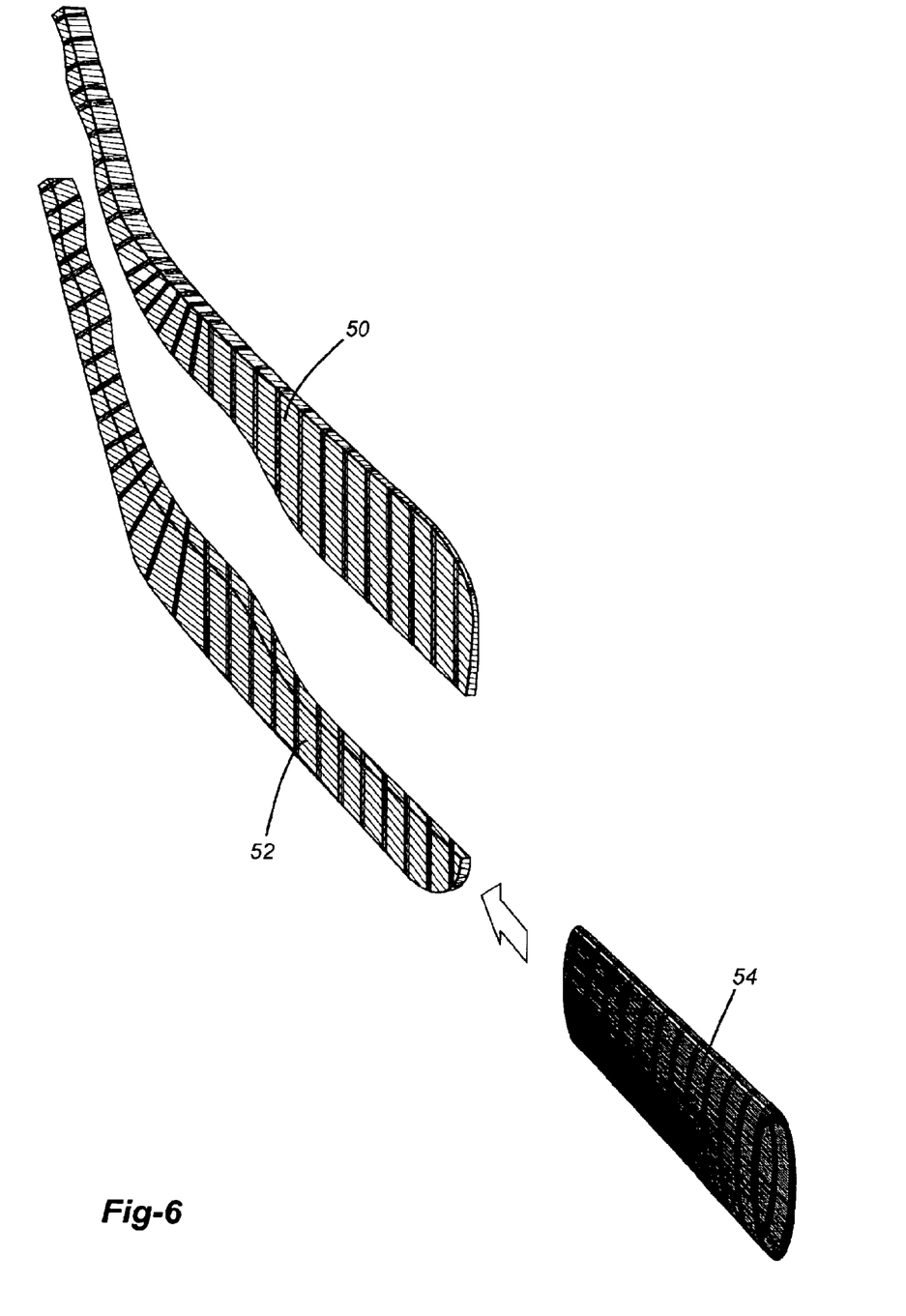
FIG. 6 is a perspective view of the first and second core portions and first and second fibers braids of FIG. 5 with a further fibers braid used in the construction of the blade of FIG. 1.
Figure 7:
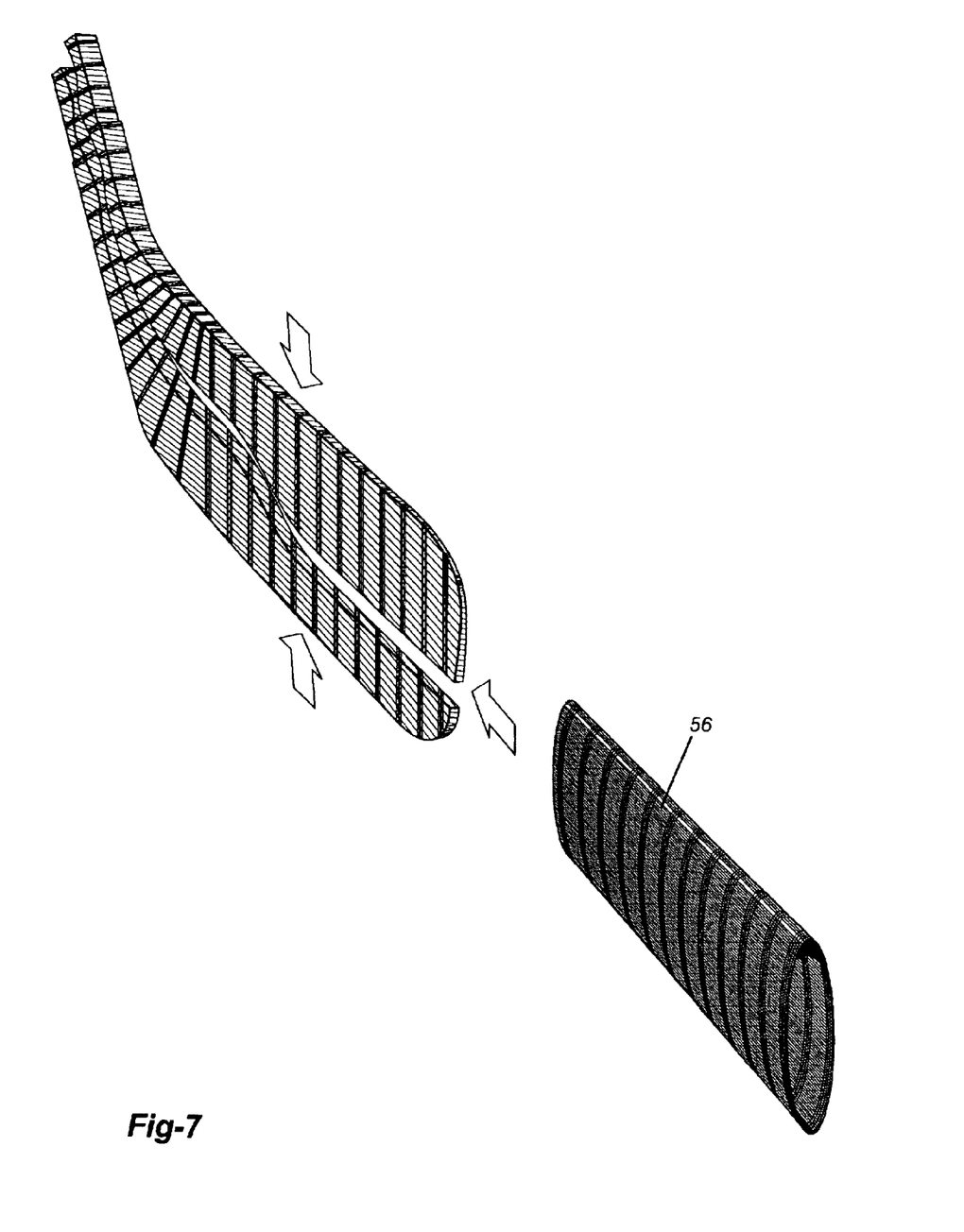
FIG. 7 is a perspective view of the first and second core portions and the fibers braids of FIG. 6 with a further fibers braid used in the construction of the blade of FIG. 1.
Figure 8:
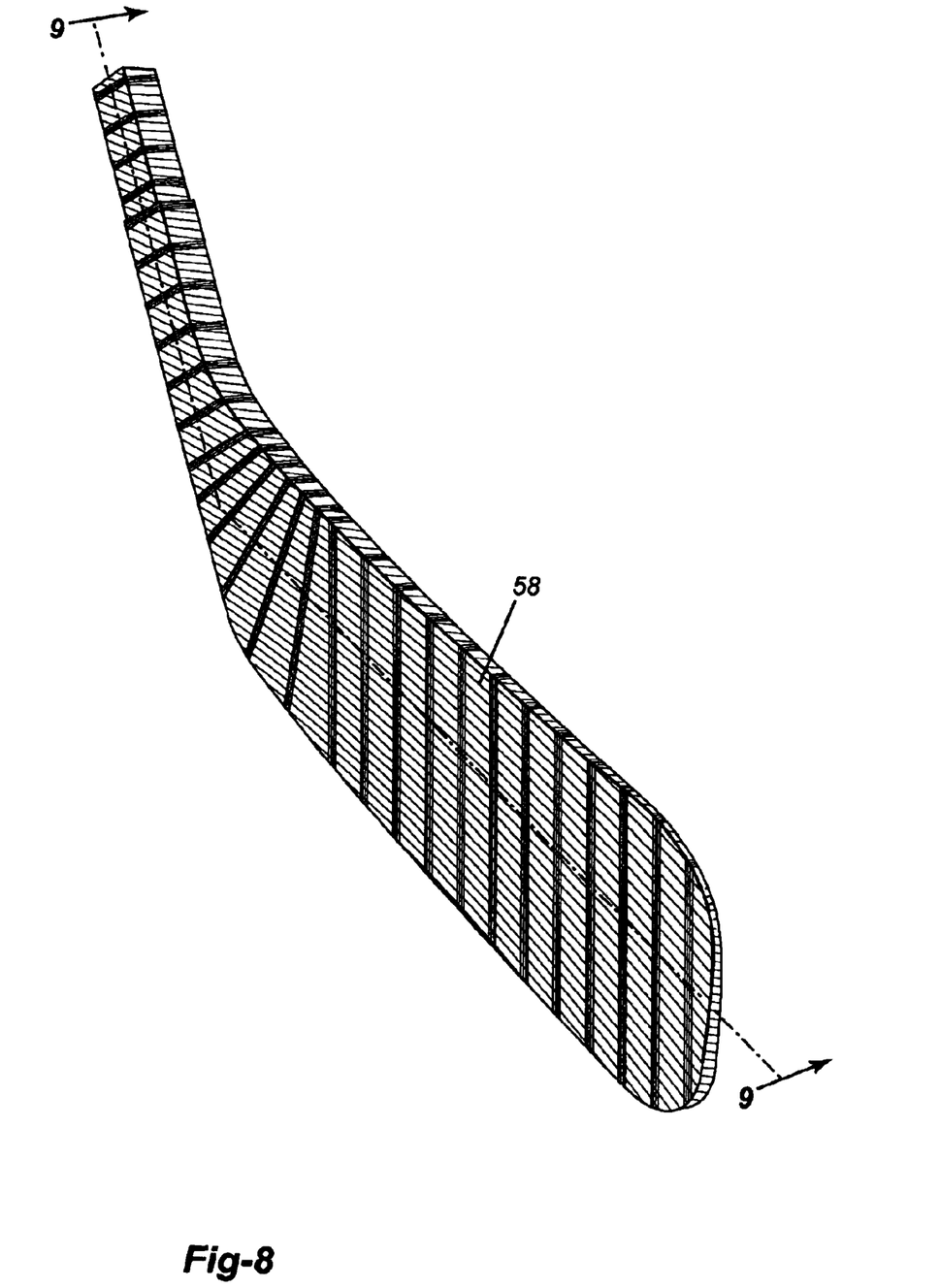
FIG. 8 is a perspective view of the blade of FIG. 1 before the molding operation.

A method of making the blade 10 is hereinafter described. As shown in FIG. 5, a first fibers braid 50 is wrapped over the first portion 34 and a second fibers braid 52 is wrapped over the second portion 36. As shown in FIG. 6, a third fibers braid 54 is wrapped over the second fibers braid 52 of the second portion 36. As shown in FIG. 7, a fourth fibers braid 56 is wrapped over the first and third fibers braids 50, 54 of the first and second portions 34, 36 such as to realize a pre-molded blade 58 as illustrated in FIG. 8. Note that the pre-molded blade 58 has the general shape of a straight hockey stick blade.

Figure 9:
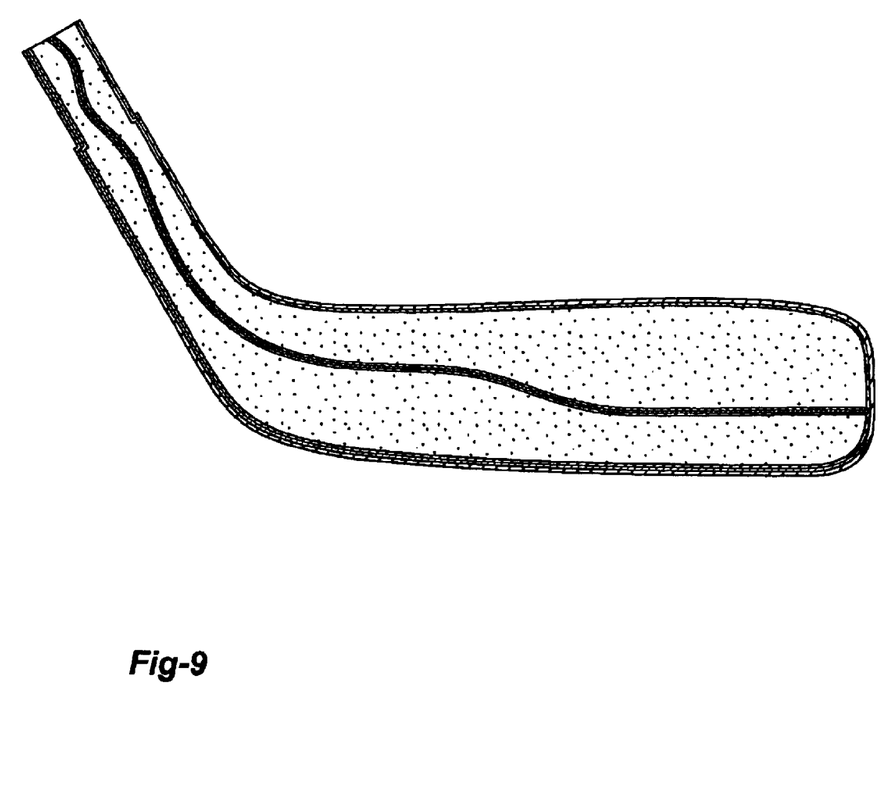
FIG. 9 is a cross sectional view taken along line 9—9 of FIG. 8.

FIG. 9 shows a cross section view of the pre-molded blade 58 for illustrating the fiber braids before the molding process. In fact, once the epoxy is injected in the fiber braids and the fiber-epoxy matrix is cured (see large lines on FIG. 4), the blade 10 comprises an interface 60 between the first and second portions 34, 36, this interface comprising fibers oriented transversely relative to the longitudinal axis A—A. The fiber-epoxy matrix of the edges 20, 22, 24 (see large lines on FIG. 4) may also comprise fibers oriented transversely relative to the longitudinal axis A—A.

Figure 10:
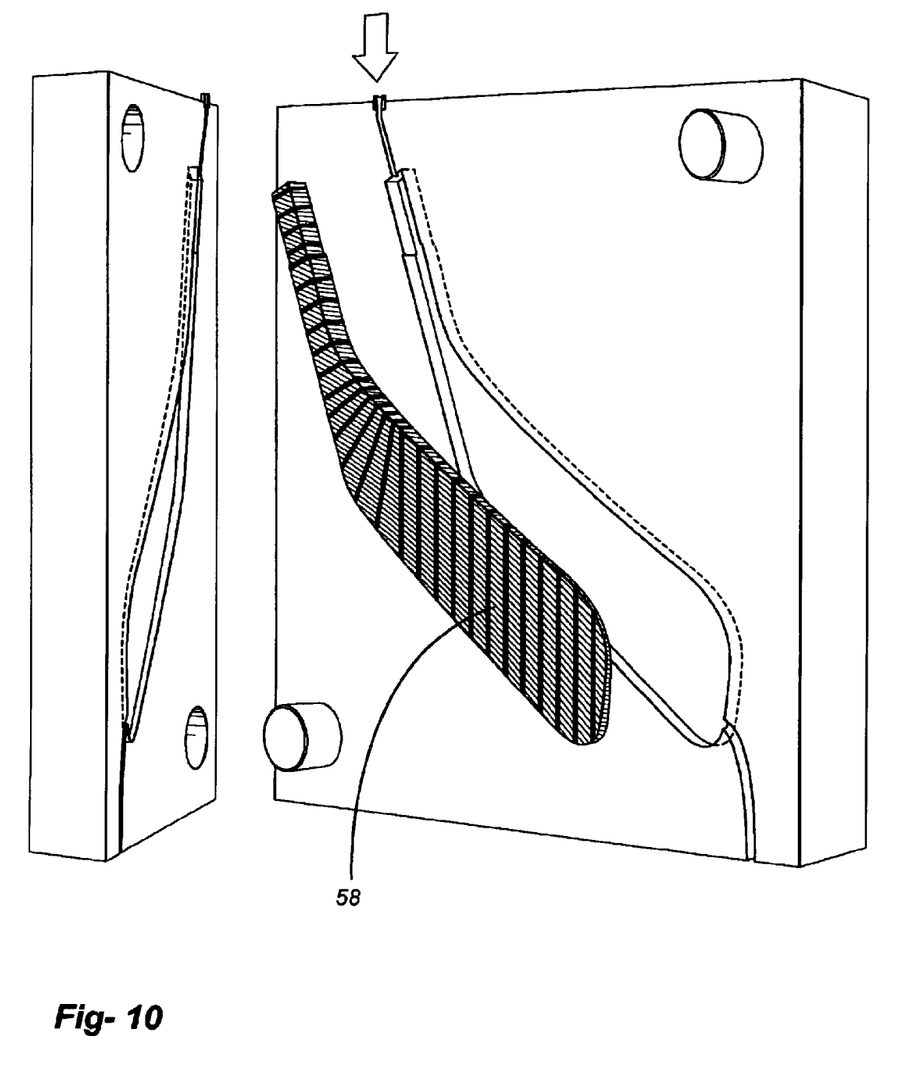
FIG. 10 is a perspective view of the pre-molded blade of FIG. 8 and a mold.

As shown in FIG. 10, the pre-molded blade 58 is afterwards inserted in a mold having the shape of the blade 10. A suitable resin (urethanes, araldite epoxy, vinylester, polycyanate, polyester or themoplastic resin) is then injected into the mold to impregnate the expandable fibers braids 50, 52, 54, 56 and heat and pressure is applied to the mold. A resin such as the resin sold by Ciba Specialty Chemicals Inc. under the name RESINFUSION may be used. The temperature of the mold may be between 85° C. and 125° C. the injection pressure of the resin may be between 25 psi and 75 psi and the injection temperature of the resin may be between 20° C. and 30° C. A vacuum pump may be mounted on the mold for easing the flow of resin through the fibers braids. Owing to the shape to the internal cavity of the mold, the pre-molded blade 58 is curved to any desired curvature typically used by hockey players such as to obtain the blade 10. When the resin is cured, the mold is opened and the blade 10 is removed.

The fibers braids 50, 52, 54, 56 are expandable so as to conform to the shape of the first and second portions 34, 36 and are made of woven fibers selected from the group consisting of carbon fibers, glass fibers, KEVLAR fibers, ceramic fibers, boron fibers, quartz fibers, spectra fibers, polyester fibers and polyethylene fibers. For instance, a 3K carbon fibers braid, medium weight, commercialized by A & P Technology may be used. Moreover, the fibers braids 50, 52, 54, 56 may be made of fibers crossing at 45°. However, any other fibers crossing at between 30° and 60° may be used.

Figure 11:
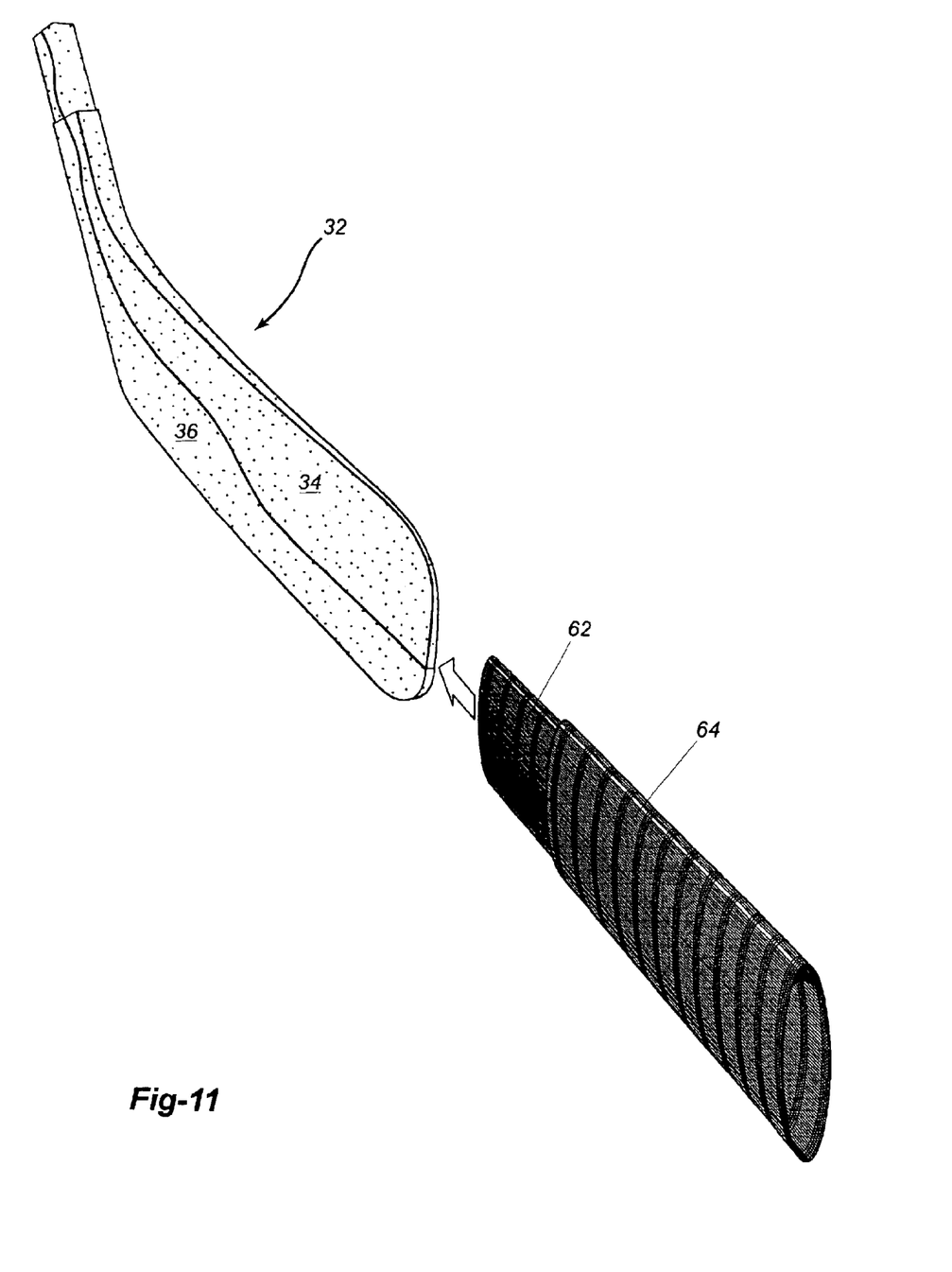
FIG. 11 is a perspective view of the first and second core portions of FIG. 3 with first and second fibers braids used in the construction of a blade according to a second embodiment.

As shown in FIG. 11, instead of using fibers braids 50, 52, 54, 56 for covering the core 32, fibers braids 62, 64 may be used for covering the core 32 in the construction of a blade according to a second embodiment. In this second embodiment, the first and second portions 34, 36 may be affixed together by applying a suitable bonding agent along the bottom surface 38 and/or the top surface 40 before wrapping the fibers braids 62, 64 over these portions 34, 36. Afterwards, the method of making the blade is identical to the one previously described.

Figure 12:
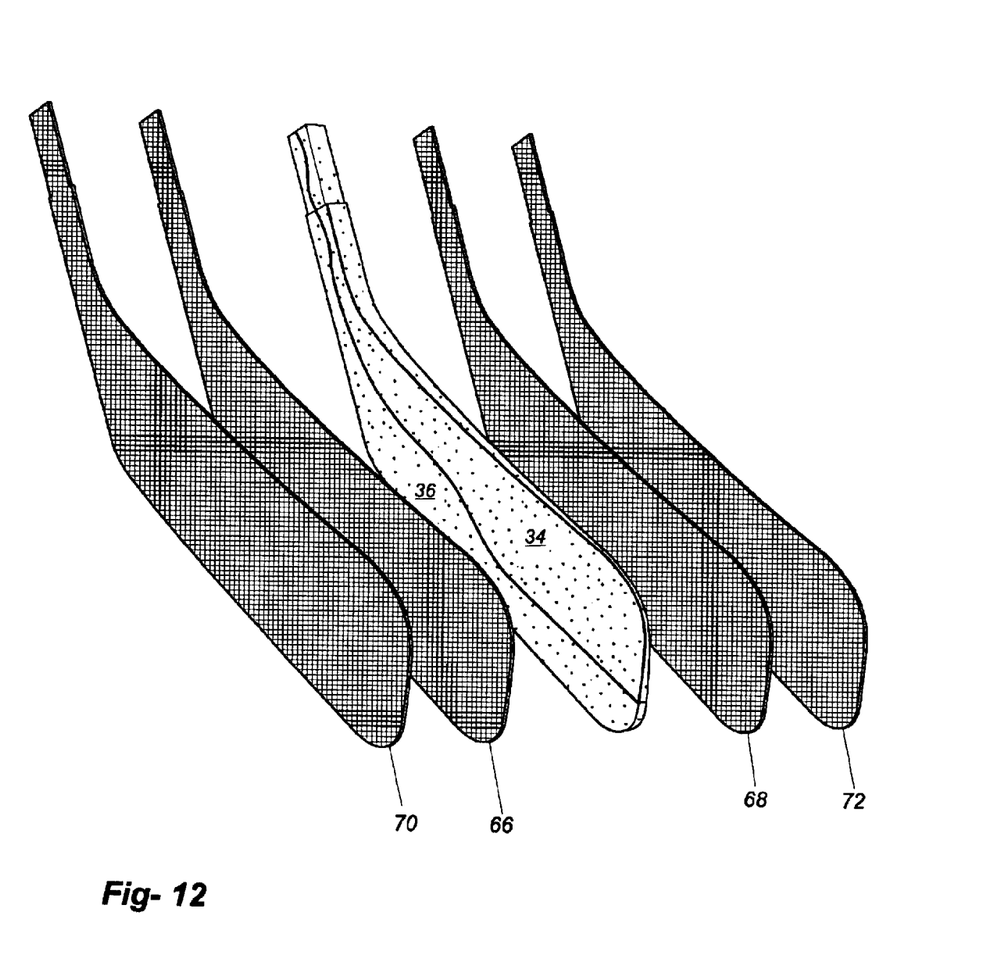
FIG. 12 is a perspective view of the first and second core portions of FIG. 3 with layers used in the construction of a blade according to a third embodiment.

As shown in FIG. 12, instead of using expandable fibers braids for covering the core 32, layers 66, 68, 70, 72 may be used for covering the core 32 in the construction of a blade according to a third embodiment. The layers 66, 68, 70, 72 are made of a material having a rigidity higher than the rigidity of the core 32 and have a shape that is slightly larger than that of the core 32 such that portions of the layers cover the edges of the core 32. Layers 66, 68, 70, 72 may be layers of uni-directional or woven fiberglass, layers of uni-directional or woven carbon or may be made of fibers preformed into laminated sheets with resin wherein the fibers may be any combination of glass, carbon, KEVLAR, ceramic, boron, quartz, spectra, polyester and polyethylene wherein the percentage of each type of fibers can vary from 0% to 100%.

In order to make the blade according to the third embodiment, the first and second 34, 36 may be first affixed together by applying a suitable bonding agent along the bottom surface 38 and/or the top surface 40. Such bonding agent may be the adhesive known and employed in the industry under the trade-mark Z-WAXX. Layers 66,68 are then wetted with a suitable bonding agent such as resin, epoxy or nylon and are applied on the back and rear faces of the core 32. Layers 66 and 68 are then recovered with respective layers 70 and 72. Again, layers 70 and 72 are wetted before with a suitable bonding agent. The blade is afterwards inserted in a mold and heat and pressure is applied thereto (no injection of resin is here necessary). When the resin is cured, the mold is opened and the blade is removed. Excess resin and material along the edges of the blade are removed with quick trimming and sanding operations.

The use of pre-impregnated expandable fibers braids is also within the spirit and scope of the present invention.

The above description of the embodiments should not be interpreted in a limiting manner since other variations, modifications and refinements are possible within the spirit and scope of the present invention. The scope of the invention is defined in the appended claims and their equivalents.

What is claimed is:

1. A hockey stick blade comprising a shank, a heel section and a blade element having a top edge, a tip edge and a bottom edge, said hockey stick blade further comprising a core extending along a longitudinal axis, said core comprising a first portion located above a second portion;
   (a) said first portion comprises a bottom surface and extends from said heel section to said tip edge, said first portion being made of foam having a first density; and
   (b) said second portion comprises a top surface and extends from said heel section to said tip edge, said second portion being made of foam having a second density, said second density being higher than said first density.

2. A hockey stick blade as defined in claim 1, wherein said first density is between 6 and 12 lbs/cubic foot.

3. A hockey stick blade as defined in claim 2, wherein said second density is between 14 and 18 lbs/cubic foot.

4. A hockey stick blade as defined in claim 3, wherein said bottom surface of said first portion extends generally along the longitudinal axis of said core.

5. A hockey stick blade as defined in claim 4, wherein said top surface of said second portion extends generally along the longitudinal axis of said core.

6. A hockey stick blade as defined in claim 3, wherein said blade element is defined by a heel region, a tip region and a middle region therebetween, said heel region extending from said heel section.

7. A hockey stick blade as defined in claim 6 wherein said top surface of said second portion extends beyond the longitudinal axis of said core in said heel region.

8. A hockey stick blade as defined in claim 7, wherein said bottom surface of said first portion extends beyond the longitudinal axis of said core in said tip region.

9. A hockey stick blade as defined in claim 8, wherein said bottom surface of said first portion generally follows said top surface of said second portion.

10. A hockey stick blade as defined in claim 9, wherein said foam is a thermo-expandable foam selected from the group consisting of polyurethane foam, ethylene vinyl acetate (EVA) foam, polyvinyl chloride (PVC) foam, ethylene polypropylene foam and polyisocyanurate foam.

11. A hockey stick blade as defined in claim 10, wherein said blade comprises a first fibers braid covering said first portion.

12. A hockey stick blade as defined in claim 11, wherein said blade comprises a second fibers braid covering said second portion.

13. A hockey stick blade as defined in claim 12, wherein said blade comprises a third fibers braid covering said second expandable fibers braid.

14. A hockey stick blade as defined in claim 13, wherein said blade comprises a fourth fibers braid covering said first and third expandable fibers braids.

15. A hockey stick blade as defined in claim 14, wherein said first, second, third and fourth fiber braids are made of fibers selected from the group consisting of carbon fibers, glass fibers, KEVLAR fibers, ceramic fibers, boron fibers, quartz fibers, spectra fibers, polyester fibers and polyethylene fibers.

16. A hockey stick blade as defined in claim 15, wherein said first, second, third and fourth fiber braids are made of fibers crossing at between 30° and 60°.

17. A hockey stick blade as defined in claim 16, wherein said blade comprises an interface between said first and second portions, said interface comprising fibers oriented transversely relative to the longitudinal axis of said core.

18. A hockey stick blade as defined in claim 17, wherein at least one of said top, tip and bottom edges of said element comprises fibers oriented transversely relative to the longitudinal axis of said core.

19. A hockey stick blade as defined in claim 18, wherein said shank comprises a tenon adapted to be inserted into a hollow hockey stick shaft.

20. A hockey stick blade as defined in claim 19, wherein said first and second portions of said core further comprise respective first and second shank portions with respective first and second tenon portions.

21. A hockey stick blade as defined in claim 20, wherein said first and second expandable fibers braids further cover said respective first and second shank portions, said third expandable fibers braids further covers said second expandable fibers braids over said second shank portion and said fourth expandable fibers braids covers said first and third expandable fibers braids over said respective first and second shank portions.

22. A hockey stick comprising a blade as defined in claim 1 and a shaft, wherein said shank of said blade is integrally formed with said shaft.

23. A hockey stick comprising a hollow shaft and a blade as defined in claim 19.

24. A hockey stick blade as defined in claim 9, wherein said bottom and top surfaces are affixed together.

25. A hockey stick blade as defined in claim 24, wherein said core comprises back and front faces.

26. A hockey stick blade as defined in claim 25, wherein said blade comprises a back layer recovering said back face and a front layer recovering said front face.

27. A hockey stick blade as defined in claim 26, wherein said back and front layers are made of a material having higher rigidity than said core.

28. A hockey stick blade as defined in claim 27, wherein said front layer is thicker than said back layer.

29. A hockey stick blade as defined in claim 27, wherein said foam is a thermo-expandable foam selected from the group consisting of polyurethane foam, ethylene vinyl acetate (EVA) foam, polyvinyl chloride (PVC) foam, ethylene polypropylene foam and polyisocyanurate foam.

30. A hockey stick blade as defined in claim 29, wherein said front and back layers comprise material selected from the group consisting of carbon fibers, glass fibers, KEVLAR fibers, ceramic fibers, boron fibers, quartz fibers, spectra fibers, polyester fibers and polyethylene fibers.

31. A hockey stick blade as defined in claim 30, wherein said shank comprises a tenon adapted to be inserted into a hollow hockey stick shaft.

32. A hockey stick comprising a hollow shaft and a blade as defined in claim 31.

* * * * *